(12) United States Patent
Ikuta et al.

(10) Patent No.: US 10,897,391 B2
(45) Date of Patent: Jan. 19, 2021

(54) FAULT DETECTION METHOD AND NODE DEVICE

(71) Applicant: FUJITSU LIMITED, Kawasaki (JP)

(72) Inventors: Yuya Ikuta, Machida (JP); Takeshi Umezuki, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 85 days.

(21) Appl. No.: 16/251,121

(22) Filed: Jan. 18, 2019

(65) Prior Publication Data
US 2019/0229982 A1    Jul. 25, 2019

(30) Foreign Application Priority Data
Jan. 24, 2018   (JP) ................. 2018-009924

(51) Int. Cl.
| | | |
|---|---|---|
| H04W 72/04 | (2009.01) | |
| H04L 12/24 | (2006.01) | |
| H04L 12/741 | (2013.01) | |
| H04L 12/751 | (2013.01) | |
| H04L 12/18 | (2006.01) | |
| H04L 12/26 | (2006.01) | |

(52) U.S. Cl.
CPC ...... H04L 41/0677 (2013.01); H04L 12/1868 (2013.01); H04L 43/10 (2013.01); H04L 45/026 (2013.01); H04L 45/745 (2013.01)

(58) Field of Classification Search
CPC ... H04L 41/0677; H04L 45/745; H04L 45/28; H04L 43/10; H04L 12/1868; H04L 45/026
See application file for complete search history.

(56) References Cited

U.S. PATENT DOCUMENTS

| | | | |
|---|---|---|---|
| 6,034,963 A | 3/2000 | Minami et al. | |
| 2005/0022089 A1* | 1/2005 | Le | H04L 1/1867 714/749 |
| 2006/0126495 A1* | 6/2006 | Guichard | H04L 41/0677 370/216 |
| 2008/0184081 A1* | 7/2008 | Hama | H04L 1/0009 714/708 |

(Continued)

FOREIGN PATENT DOCUMENTS

| | | |
|---|---|---|
| JP | 2006-080584 | 3/2006 |
| JP | 2010-063110 | 3/2010 |

*Primary Examiner* — Hassan Kizou
*Assistant Examiner* — Mahbubul Bar Chowdhury
(74) *Attorney, Agent, or Firm* — Fujitsu Patent Center

(57) ABSTRACT

A first node device is included in a network including a plurality of node devices including a plurality of terminals and a plurality of relay devices relaying a packet transmitted and received between the plurality of terminals. The first node device includes a memory, and a processor coupled to the memory and the processor configured to determine whether a second node device detects a possibility of disappearance of a first packet in the network, the first packet being transmitted from a third node device to the second node device, and when determining that the second node device detects the possibility, transmit first information to a respective node device on one or more paths present between the first node device and the third node device in the network, the first information requesting to determine whether the respective node device transmits or receives the first packet.

13 Claims, 11 Drawing Sheets

(56) References Cited

U.S. PATENT DOCUMENTS

| | | | |
|---|---|---|---|
| 2009/0052332 A1* | 2/2009 | Fukuyama | H04L 41/06 370/242 |
| 2009/0279429 A1* | 11/2009 | Griffoul | H04L 47/10 370/230 |
| 2010/0281118 A1* | 11/2010 | Donahue | H04L 67/145 709/206 |
| 2015/0009999 A1* | 1/2015 | Oguchi | H04L 63/00 370/392 |

* cited by examiner

FIG. 3A

| TIME | TRANSMISSION SOURCE | TRANSMISSION DESTINATION | SEQUENCE NUMBER | PORT NUMBER | FLAG |
|---|---|---|---|---|---|
| 17:00:00 | 1a_IPaddress | 1c_IPaddress | 1 | 1 | 0 |

FIG. 3B

| TIME | TRANSMISSION SOURCE | TRANSMISSION DESTINATION | SEQUENCE NUMBER | PORT NUMBER | FLAG |
|---|---|---|---|---|---|
| 17:10:00 | 1a_IPaddress | 1c_IPaddress | 1 | 1 | 1 |
| 17:10:01 | 1a_IPaddress | 1c_IPaddress | 2 | 1 | 0 |

FIG. 3C

| TIME | TRANSMISSION SOURCE | TRANSMISSION DESTINATION | SEQUENCE NUMBER | PORT NUMBER | FLAG |
|---|---|---|---|---|---|
| 17:10:00 | 1a_IPaddress | 1c_IPaddress | 1 | 1 | 1 |
| 17:10:01 | 1a_IPaddress | 1c_IPaddress | 2 | 1 | 0 |
| 17:10:02 | 1a_IPaddress | 1c_IPaddress | 4 | 1 | 0 |

FIG. 3D

| TIME | TRANSMISSION SOURCE | TRANSMISSION DESTINATION | SEQUENCE NUMBER | PORT NUMBER | FLAG |
|---|---|---|---|---|---|
| 17:10:00 | 1a_IPaddress | 1c_IPaddress | 1 | 1 | 1 |
| 17:10:01 | 1a_IPaddress | 1c_IPaddress | 2 | 1 | 1 |
| 17:10:02 | 1a_IPaddress | 1c_IPaddress | 4 | 1 | 0 |
| 17:10:03 | 1a_IPaddress | 1c_IPaddress | 3 | 1 | 1 |

FIG. 3E

| TIME | TRANSMISSION SOURCE | TRANSMISSION DESTINATION | SEQUENCE NUMBER | PORT NUMBER | FLAG |
|---|---|---|---|---|---|
| 17:10:00 | 1a_IPaddress | 1c_IPaddress | 1 | 1 | 1 |
| 17:10:01 | 1a_IPaddress | 1c_IPaddress | 2 | 1 | 1 |
| 17:10:02 | 1a_IPaddress | 1c_IPaddress | 4 | 1 | 1 |
| 17:10:03 | 1a_IPaddress | 1c_IPaddress | 3 | 1 | 1 |
| 17:10:04 | 1a_IPaddress | 1c_IPaddress | 5 | 1 | 0 |

| TIME | TRANSMISSION SOURCE | TRANSMISSION DESTINATION | SEQUENCE NUMBER | PORT NUMBER | FLAG |
|---|---|---|---|---|---|
| 17:10:00 | 1a_IPaddress | 1c_IPaddress | 1 | 1 | 1 |
| 17:10:01 | 1a_IPaddress | 1c_IPaddress | 2 | 1 | 0 |
| 17:10:03 | 1a_IPaddress | 1c_IPaddress | 4 | 1 | 1 |
| 17:10:04 | 1a_IPaddress | 1c_IPaddress | 5 | 1 | 0 |

FAULT DETECTION METHOD AND NODE DEVICE

CROSS-REFERENCE TO RELATED APPLICATION

This application is based upon and claims the benefit of priority of the prior Japanese Patent Application No. 2018-9924, filed on Jan. 24, 2018, the entire contents of which are incorporated herein by reference.

FIELD

Embodiments discussed herein are related to a fault detecting technology and a node device.

BACKGROUND

In recent years, it has become common for a network user to deposit data in a data center, and due to a resulting increase in system scale and an effect of multi-tenancy in which a plurality of users share and use a same system environment or the like, a network configuration has become very complicated as compared with a network configuration of the related technology.

There is, for example, a technology that, when a fault occurs in a wide area network (WAN), analyzes a log of each relay switch and a packet collected by coupling a dedicated apparatus to a network path in order to identify a location of the occurrence of the fault and a cause of the occurrence of the fault.

Related technologies are disclosed in Japanese Laid-open Patent Publication No. 2006-80584 and Japanese Laid-open Patent Publication No. 2010-63110, for example.

SUMMARY

According to an aspect of the embodiments, a first node device is included in a network including a plurality of node devices including a plurality of terminals and a plurality of relay devices relaying a packet transmitted and received between the plurality of terminals. The first node device includes a memory, and a processor coupled to the memory and the processor configured to determine whether a second node device detects a possibility of disappearance of a first packet in the network, the first packet being transmitted from a third node device to the second node device, and when determining that the second node device detects the possibility, transmit first information to a respective node device on one or more paths present between the first node device and the third node device in the network, the first information requesting to determine whether the respective node device transmits or receives the first packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A-3E are diagrams illustrating examples of a reception history table;

FIG. 4 is a diagram illustrating another example of a reception history table;

DESCRIPTION OF EMBODIMENTS

Figure 1:
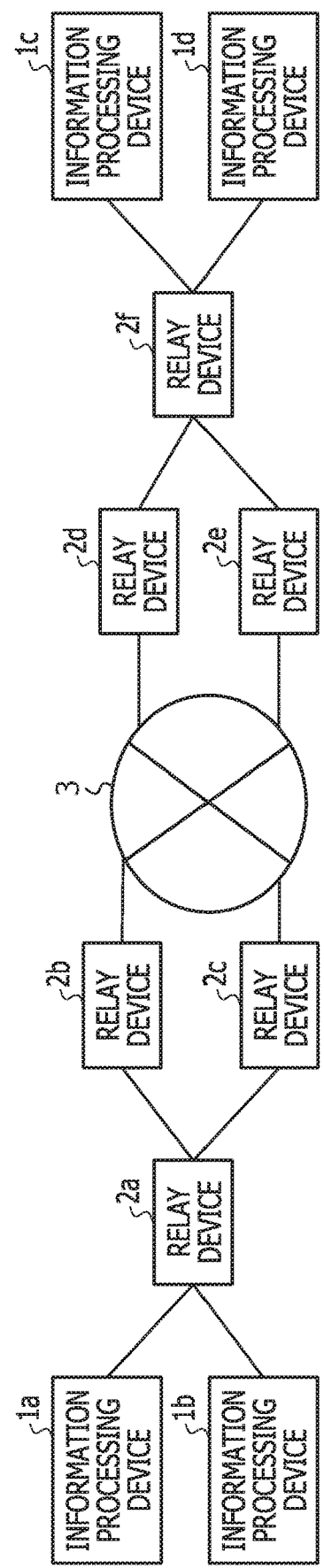
FIG. 1 is a diagram illustrating an example of a configuration of a system.

In the related technology, when a fault occurs, the log of the relay switch is analyzed by tracing back to a time of occurrence of the fault. However, it is difficult to identify a location of the occurrence of the fault in a case where the event is not reproduced even when the dedicated apparatus is coupled to the network path and the packet is collected. In addition, there are not a few cases where an outgoing packet transfer path and a return packet transfer path are different from each other in a complicated network in recent years. In such cases, it is more difficult to identify the location of the occurrence of the fault.

Each embodiment will hereinafter be described in detail with reference to the drawings. Each piece of processing in each embodiment can be modified as appropriate. Incidentally, in all of the drawings for description of each embodiment, the same parts are identified by the same reference numerals in principle, and repeated description thereof will be omitted.

A first embodiment will be described in the following. FIG. 1 is a diagram illustrating an example of a configuration of a system according to the first embodiment. The system according to the first embodiment includes an information processing device 1a, an information processing device 1b, an information processing device 1c, an information processing device 1d, a relay device 2a, a relay device 2b, a relay device 2c, a relay device 2d, a relay device 2e, a relay device 2f, a network 3, and an administrator terminal 4. In the following, when the information processing device 1a, the information processing device 1b, the information processing device 1c, and the information processing device 1d are not distinguished from each other, the information processing devices will be described as information processing devices 1. Similarly, when the relay device 2a, the relay device 2b, the relay device 2c, the relay device 2d, the relay device 2e, and the relay device 2f are not distinguished from each other, the relay devices will be described as relay devices 2.

The configuration of the system illustrated in FIG. 1 is an example, and the information processing devices 1 and the relay devices 2 are not limited to the numbers of the information processing devices 1 and the relay devices 2. In addition, the information processing devices 1 and the relay devices 2 will be referred to collectively as node devices.

The information processing devices 1 may be, for example, an ordinary computer that a user directly operates or performs input to, or a server computer that provides service to a user. The information processing devices 1 mutually perform communication with each other via the relay devices 2 and the network 3.

The relay devices 2 are, for example, a transmitting device, or may be a router, a relay switch, or the like. The relay devices 2 perform path selection based on destination information (so-called routing table), and transfer a received Internet protocol (IP) packet.

The network 3 is, for example, a WAN, and may be relayed by the plurality of relay devices 2.

The administrator terminal 4 is, for example, an ordinary computer for use by a system administrator at a time of fault occurrence. The system administrator uses the administrator terminal 4 to view fault information collected in the administrator terminal 4. An example is illustrated in which the administrator terminal 4 is coupled to the network 3. However, the administrator terminal 4 is not limited to this. The administrator terminal 4 may be coupled to each of the relay devices 2 by a dedicated circuit for collecting the fault information.

Figure 2:
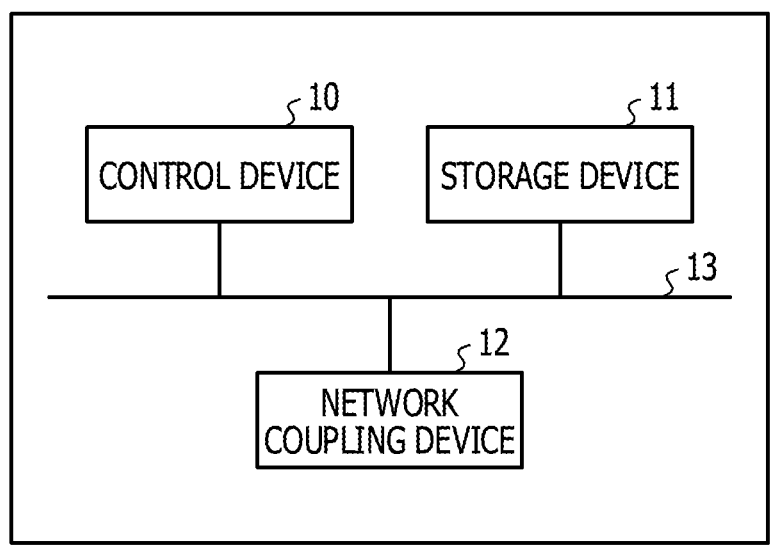
FIG. 2 is a diagram illustrating an example of a hardware configuration of a relay device.

Next, description will be made of the relay devices 2. FIG. 2 illustrates an example of a hardware configuration of a relay device according to the first embodiment. The relay device 2 includes a control device 10, a storage device 11, and a network coupling device 12, which are coupled to one another by a system bus 13.

The control device 10 is a device that controls the relay device 2. An electronic circuit such as an application specific integrated circuit (ASIC), a central processing unit (CPU), a micro processing unit (MPU), or the like may be used as the control device 10. The control device 10 performs various processing by controlling operation of the relay device 2 such as various arithmetic operations, data input and output from and to each hardware constituent unit, and the like based on an operating system (OS) and various programs stored in the storage device 11. Various information needed during the execution of the programs or the like can be obtained from the storage device 11, for example. Incidentally, a part of the processing performed by the control device 10 may be implemented by using dedicated hardware. The control device 10 performs history information generation processing, fault detection processing, and fault determination processing according to the first embodiment by reading and executing a program according to the first embodiment, the program being stored in the storage device 11. Incidentally, a packet loss is cited as an example of a fault.

The storage device 11, for example, stores the OS and application programs executed by the control device 10 and a routing table for determining a destination at a time of packet transfer. In addition, the storage device 11 stores various programs and data needed for the processing according to the first embodiment by the control device 10. Incidentally, for example, a ternary content addressable memory (TCAM), a read only memory (ROM), a random access memory (RAM), a flash memory, or the like may be used as the storage device 11.

The network coupling device 12 is a network interface. The network coupling device 12, for example, includes a plurality of ports. Packets are transmitted and received via the network coupling device 12. In addition, each of the ports may be provided with a light emitting diode (LED) that indicates a state of operation.

A concrete operation of the relay device 2 will be illustrated in the following. The relay device 2 performs ordinary packet transfer processing. For example, when the control device 10 of the relay device 2 receives a packet, the control device 10 identifies the port number of a transfer destination based on the IP address of a transmission destination, the IP address being included in a header, and the routing table, and transmits the packet from a port of the identified port number.

Separately from the ordinary packet transfer processing, the relay device 2 has a function of performing history information generation processing. The control device 10 of the relay device 2, for example, identifies the IP address of a transmission source, the IP address of the transmission destination, and a sequence number, which are included in the header of the received packet. The control device 10 stores the identified IP address of the transmission source, the identified IP address of the transmission destination, and the identified sequence number as a reception history in association with packet reception time information, a port number, and status information.

Similarly, the control device 10 identifies the IP address of the transmission source, the IP address of the transmission destination, and the sequence number, which are included in the transmitted packet. The control device 10 stores the identified IP address of the transmission source, the identified IP address of the transmission destination, and the identified sequence number as a transmission history in association with packet transmission time information, a port number, and a flag used for fault detection. Incidentally, the flag used for fault detection is information for determining the presence or absence of a fault by referring to the flag at a time of fault detection processing. The flag is, for example, information of 0 or 1, with 0 denoting a notification object, and with 1 denoting normality.

The information stored in the histories is not limited to the IP address of the transmission source and the IP address of the transmission destination, but it suffices for the information to be able to identify the transmission source and the transmission destination uniquely. For example, a host name may be used. Further, the information stored in the histories is not limited to the illustrated information, but may include other different information.

FIGS. 3A-3E are diagrams illustrating examples of a reception history table. FIGS. 3A-3E illustrate state transitions in a reception history table 30. For the convenience of description, "1a_IPaddress" as the IP address of the information processing device 1a and "1c_IPaddress" as the IP address of the information processing device 1c are entered in a transmission source column and a transmission destination column of the reception history table 30. In actuality, however, the respective IP addresses are stored in the transmission source column and the transmission destination column of the reception history table 30. In the following, the transitions from a state described in FIG. 3A to a state described in FIG. 3E will be described in order.

The state described in FIG. 3A represents a state of the reception history table 30 when the relay device 2 has received a packet whose transmission source is the information processing device 1a, whose transmission destination is the information processing device 1c, and whose sequence number is 1. As indicated by the state described in FIG. 3A, the control device 10 of the relay device 2 adds, to the reception history table 30, a record corresponding to the reception of the packet whose sequence number is 1, the record including the information of the transmission source, the transmission destination, and the sequence number and information of a reception time, a receiving port, and a flag 0. The control device 10 sets the flag to 0 in a stage of receiving the packet.

Following the state described in FIG. 3A, a state described in FIG. 3B represents a state of the reception history table 30 when the relay device 2 has received a packet whose transmission source is the information processing device 1a, whose transmission destination is the information processing device 1c, and whose sequence number is 2. As indicated by the state described in FIG. 3B, a record corresponding to the reception of the packet whose sequence number is 2 is added to the reception history table 30. The control device 10 updates the flag in the record corresponding to the reception of the packet whose sequence number is 1, which is the immediately preceding sequence number, from 0 to 1. As described above, in the reception history table 30, the flag is updated to 1, which denotes normality, when the packet of the immediately subsequent sequence number is received.

Following the state described in FIG. 3B, a state described in FIG. 3C represents a state of the reception history table 30 when the relay device 2 has received a packet whose transmission source is the information processing device 1a, whose transmission destination is the information processing device 1c, and whose sequence number is 4 before receiving a packet whose sequence number is 3. As indicated by the state described in FIG. 3C, the control device 10 adds, to the reception history table 30, a record corresponding to the reception of the packet whose sequence number is 4. In the state described in FIG. 3C, the flag of the record corresponding to the reception of the packet whose sequence number is 2 remains 0 because the packet whose sequence number is 3 is not received.

Following the state described in FIG. 3C, a state described in FIG. 3D represents a state of the reception history table 30 when the relay device 2 has received the packet whose transmission source is the information processing device 1a, whose transmission destination is the information processing device 1c, and whose sequence number is 3. As indicated by the state described in FIG. 3D, the control device 10 adds, to the reception history table 30, a record corresponding to the reception of the packet whose sequence number is 3. The control device 10 updates the flag of the record corresponding to the reception of the packet whose sequence number is 2, which is the immediately preceding sequence number, from 0 to 1. Further, because the control device 10 has already received the packet having the immediately subsequent sequence number of 4, the control device 10 sets the flag of the record corresponding to the reception of the sequence number 3 to 1.

Following the state described in FIG. 3D, the state described in FIG. 3E represents a state of the reception history table 30 when the relay device 2 has received a packet whose transmission source is the information processing device 1a, whose transmission destination is the information processing device 1c, and whose sequence number is 5. As indicated by the state described in FIG. 3E, the control device 10 adds, to the reception history table 30, a record corresponding to the reception of the packet whose sequence number is 5. The control device 10 updates the flag of the record corresponding to the reception of the packet whose sequence number is 4, which is the immediately preceding sequence number, from 0 to 1.

The relay device 2 stores the reception history of the packets by the process as described above. Even in a case where the order of the sequence numbers of the received packets is interchanged, when the packets are received without a missing sequence number, the relay device 2 determines that the packets are received normally. This is because no loss of a sequence number indicates that no packet has disappeared (occurrence of no packet loss). The relay device 2 stores the transmission history of the packets according to the order of transmission of the packets as in the reception history. When no abnormality has occurred within the relay device 2, the reception history and the transmission history substantially similar to each other are stored in which the transmission source, the transmission destination, the sequence numbers, and the flags are the same. By storing the reception history and the transmission history, the relay device 2 can detect an abnormality that occurs within the own device.

In addition, the control device 10 of the relay device 2 may delete records whose flag is 1 as appropriate in the reception history table 30 and the transmission history table. The records whose flags are set to 1 are an unnecessary history in the processing of fault detection, and the deletion can reduce a decrease in available memory space.

FIG. 4 is a diagram illustrating an example of a reception history table. FIG. 4 illustrates a state of the reception history table 30 in a case where the packet whose sequence number is 3 is lost, and thus the relay device 2 does not receive the packet whose sequence number is 3. As indicated by FIG. 4, the flag of the record corresponding to the reception of the packet whose sequence number is 2 remains 0 because the packet having the immediately subsequent sequence number of 3 is not received.

In addition, the relay device 2 has a function of performing fault detection processing. When the control device 10 of the relay device 2 receives a Selective ACKnowledgment (SACK) packet, for example, the control device 10 analyzes the SACK packet, and identifies the IP address of a transmission source, the IP address of a transmission destination, and a sequence number in a missing packet. The SACK packet is an acknowledgment that is transmitted from an end device as the transmission destination of data and notifies the loss of the packet. In a case where data is transmitted from the information processing device 1a to the information processing device 1c, for example, the SACK packet is transmitted from the information processing device 1c to the information processing device 1a in response to reception of the data.

The control device 10 refers to the reception history table 30 and the transmission history table, and determines the presence or absence of a record having the same IP address of the transmission source and the same IP address of the transmission destination as in the missing packet, having a sequence number immediately preceding the sequence number of the missing packet, and having a flag 0.

When there is such a record, the control device 10 determines that a fault is detected, and transmits fault information regarding the missing packet in question to the administrator terminal 4. The control device 10 may also turn on the LED of a port corresponding to the port number of the record in question. The fault information may include, for example, the IP address of the transmission source, the IP address of the transmission destination, the sequence number, a receiving port number, and a transmitting port number of the missing packet and the identification information of the relay device 2 that detects the fault.

After receiving the SACK packet, the control device 10 may delete the record having the same IP address of the transmission source and the same IP address of the transmission destination as in the missing packet in the reception history table 30 and the transmission history table. This is because when the SACK packet is received by the transmission source, the packet is retransmitted between end devices as the transmission source and the transmission destination, and therefore the previous history information becomes unnecessary.

For example, in a case where the reception history table 30 is in the state illustrated in FIG. 4, when the control device 10 of the relay device 2 receives the SACK packet, the control device 10 analyzes the SACK packet, and identifies the IP address of the information processing device 1a as the IP address of the transmission source of the (missing) packet that is not received by the end device, identifies the IP address of the information processing device 1c as the IP address of the transmission destination of the packet, and identifies the sequence number of the packet as 3. The control device 10 refers to the reception history table 30, and determines the presence or absence of a record having the IP address of the information processing device 1a as the IP address of the transmission source, having the IP address of the information processing device 1c as the IP address of the transmission destination, having the immediately preceding sequence number of 2, and having a flag 0.

As indicated by the reception history table 30 of FIG. 4, as a result of referring to the reception history table 30, the control device 10 detects the presence of a record having the IP address of the information processing device 1a as the IP address of the transmission source, having the IP address of the information processing device 1c as the IP address of the transmission destination, having the immediately preceding sequence number of 2, and having a flag 0. Because of the presence of such a record, the control device 10 determines that there is a fault.

When the relay device 2 detects the fault based on the SACK packet, the relay device 2 transmits a fault determination request to the other relay devices 2 within the system. The relay device 2 may, for example, refer to the destination information of the other relay devices 2, the destination information being stored in the storage device 11. Incidentally, the destination information in this case is different from the usual routing table. In a case where an outgoing packet path and a return packet path are different from each other or in a case where the routing table is updated, for example, the missing packet (outgoing) and the SACK packet (return) pass through the different paths. When the usual routing table is used even though the fault determination request is to be transmitted to the other relay devices 2 on the path of the missing packet (outgoing), relay devices 2 to which to transmit the fault determination request may be omitted from the destinations of the fault determination request.

Hence, the relay device 2 determines the transmission destinations of the fault determination request based on a rule different from the usual routing table. For example, the relay device 2 may refer to the destination information, generate the fault determination request in which all of the other relay devices 2 within the system are each set as a destination, and transmit the fault determination request. In addition, the relay device 2 may refer to the destination information, generate the fault determination request in which relay devices 2 on each path between the own device and the information processing device 1a as the transmission source of the (missing) packet are set as destinations, and transmit the fault determination request. In addition, because relay devices 2 on the path of the SACK packet can detect and determine the fault based on the SACK packet, the relay devices 2 on the path of the SACK packet may be excluded from the destinations of the fault determination request. Further, a method is also conceivable which transmits the fault determination request to only adjacent relay devices 2, and thereafter delivers the fault determination request to the other relay devices 2 on the network without omission by a so-called bucket brigade system. For the transmission of the fault determination request, the network 3 may be used, or another dedicated network for fault determination may be used.

The relay device 2 also has a function of performing fault determination processing. The fault determination processing is performed based on a fault determination request transmitted from another relay device 2 within the system. When the control device 10 of the relay device 2 receives the determination request, for example, the control device 10 determines the presence or absence of a pertinent record in the reception history table 30 and the transmission history table based on the IP address of a transmission source, the IP address of a transmission destination, and a sequence number that are included in the determination request. When there is a pertinent record, the control device 10 of the relay device 2 determines that a fault is detected, and transmits information regarding the pertinent record to the administrator terminal 4.

Figure 5:
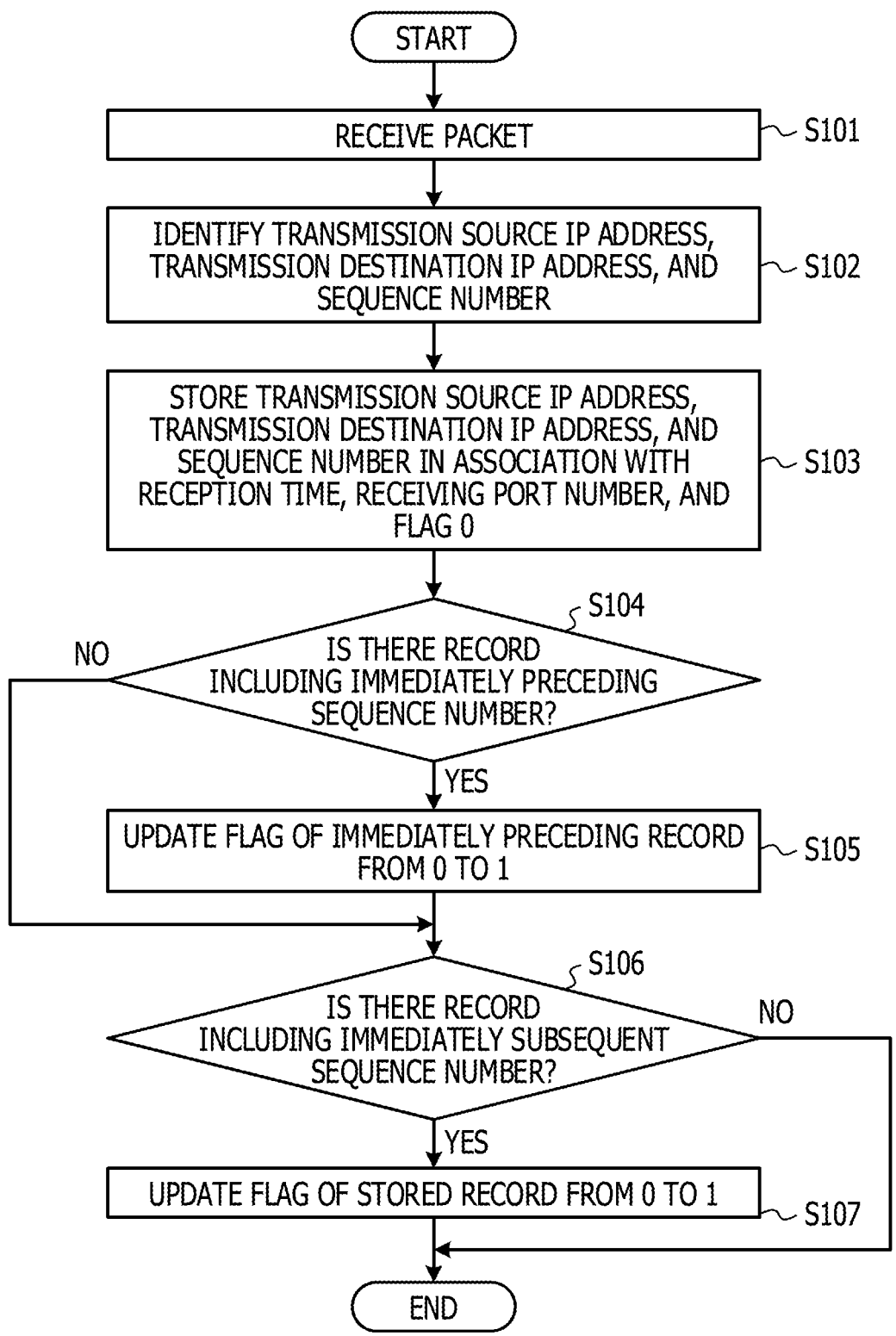
FIG. 5 is a flowchart illustrating an example of a processing procedure for generation of a reception history.

Description will be made of an example of a processing procedure for generation of history information by the relay device 2 according to the first embodiment. FIG. 5 is a flowchart illustrating an example of a processing procedure for generation of a reception history by a relay device.

As an example, the relay device 2 receives a packet (S101). The control device 10 identifies the IP address of a transmission source, the IP address of a transmission destination, and a sequence number from the header information of the received packet (S102). The control device 10 stores the identified IP address of the transmission source, the identified IP address of the transmission destination, and the identified sequence number in the reception history table 30 in association with the reception time of the packet, a receiving port number, and a flag 0 (S103). The control device 10 refers to the reception history table 30, and determines the presence or absence of a record corresponding to the reception of a packet having the same identified IP address of the transmission source and the same identified IP address of the transmission destination and having an immediately preceding sequence number (S104).

When there is no record corresponding to the reception of a packet having the immediately preceding sequence number (No in S104), the control device 10 proceeds to step of S106.

When there is a record corresponding to the reception of a packet having the immediately preceding sequence number (Yes in S104), the control device 10 updates the flag of the record having the immediately preceding sequence number from 0 to 1 (S105).

The control device 10 refers to the reception history table 30, and determines the presence or absence of a record corresponding to the reception of a packet having the same identified IP address of the transmission source and the same identified IP address of the transmission destination and having an immediately subsequent sequence number (S106).

When there is a record corresponding to the reception of the packet having the immediately subsequent sequence number (Yes in S106), the control device 10 updates the flag of the stored record from 0 to 1 (S107). The control device 10 ends the reception history generation processing.

When there is no record corresponding to the reception of the packet having the immediately subsequent sequence number (No in S106), the control device 10 ends the reception history generation processing.

Incidentally, when the control device 10 transmits the packet, the control device 10 updates the transmission history table and generates the transmission history based on similar processing.

Figure 6:
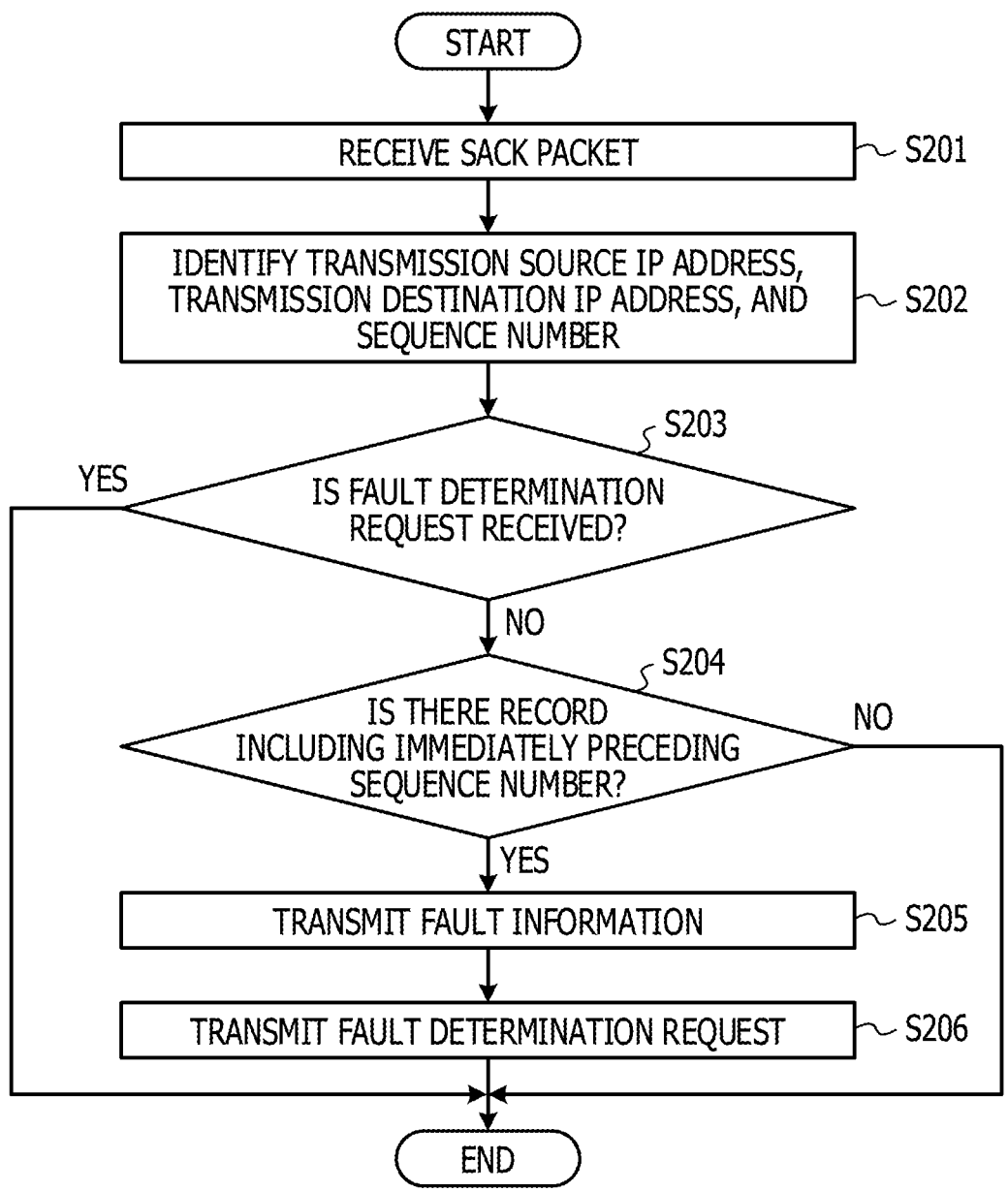
FIG. 6 is a flowchart illustrating an example of a processing procedure for fault detection.

Description will be made of an example of a processing procedure for fault detection by the relay device 2 according to the first embodiment. FIG. 6 is a flowchart illustrating an example of a processing procedure for fault detection by a relay device.

The relay device 2 receives a SACK packet (S201). The control device 10 of the relay device 2 analyzes the received SACK packet, and identifies the IP address of a transmission source, the IP address of a transmission destination, and a sequence number in a missing packet (S202). The control device 10 determines whether a fault determination request corresponding to the identified IP address of the transmission source, the identified IP address of the transmission destination, and the identified sequence number is already received (S203).

When the control device 10 determines that the corresponding fault determination request is already received (Yes in S203), the control device 10 ends the fault detection processing. The SACK packet passes through a plurality of relay devices 2. Another relay device 2 may therefore detect a fault. In this case, by receiving a fault determination request from the other relay device 2 detecting the fault, the relay device 2 is already performing the fault determination processing based on the fault determination request, and therefore the relay device 2 does not need to perform the fault detection processing again.

When the control device 10 determines that the corresponding fault determination request is not received (No in S203), the control device 10 refers to the reception history table 30, and determines the presence or absence of a record having a flag 0 and corresponding to the reception of a packet having the same identified IP address of the transmission source and the same identified IP address of the transmission destination, and having an immediately preceding sequence number (S204).

When there is no record having a flag 0 and corresponding to the reception of a packet having the immediately preceding sequence number (No in S204), the control device 10 ends the fault detection processing. Before the control device 10 ends the fault detection processing, when there are records corresponding to the reception of packets having the same identified IP address of the transmission source and the same identified IP address of the transmission destination in the reception history table 30, the control device 10 may delete the records corresponding to the reception of the packets having the same identified IP address of the transmission source and the same identified IP address of the transmission destination.

When there is a record having a flag 0 and corresponding to the reception of a packet having the immediately preceding sequence number (Yes in S204), the control device 10 determines that there is a fault related to the missing packet, and transmits fault information to the administrator terminal 4 (S205). The control device 10 transmits a fault determination request including the information of the IP address of the transmission source, the IP address of the transmission destination, and the sequence number of the missing packet to the other relay devices 2 within the system (S206). The control device 10 deletes the record corresponding to the reception of the packet having the same IP address of the transmission source and the same IP address of the transmission destination of the missing packet from the reception history table 30, and then ends the fault detection processing.

Incidentally, a flow in which the reception history table 30 is referred to in the fault detection processing is illustrated. However, without limitation to this, the transmission history table may be referred to, or both of the reception history table 30 and the transmission history table may be referred to in one time of fault detection processing.

Figure 7:
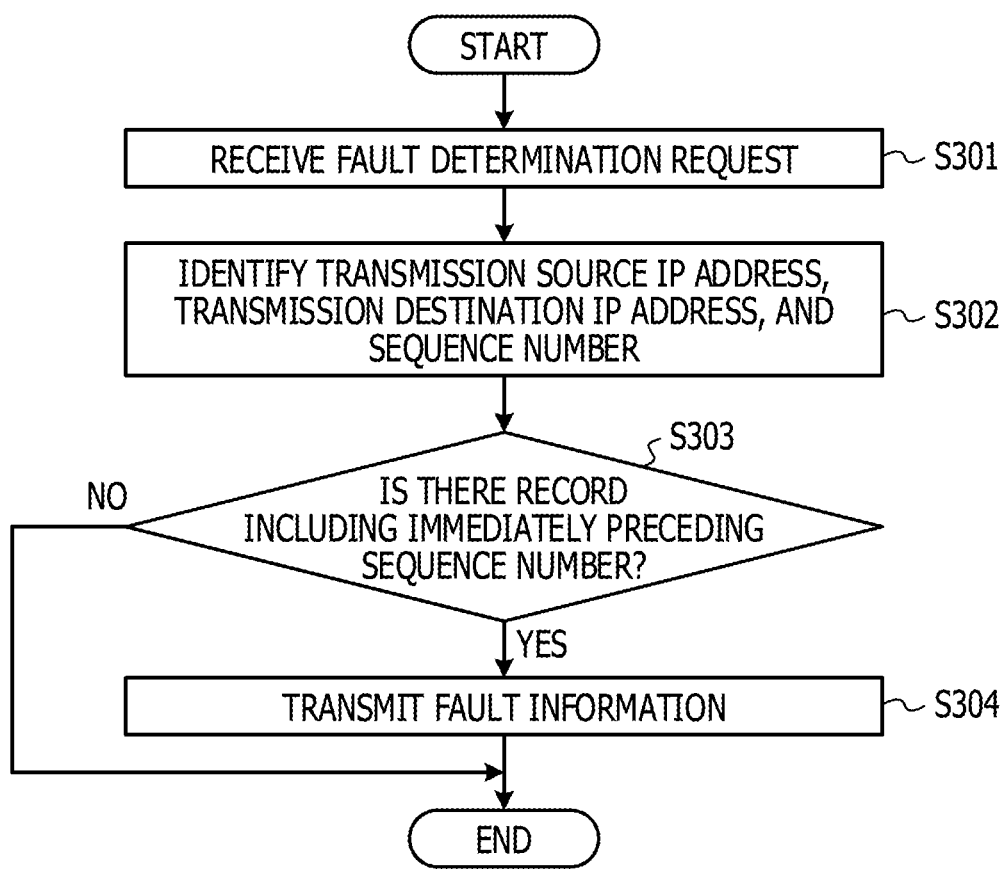
FIG. 7 is a flowchart illustrating an example of a processing procedure for fault determination.

Description will be made of an example of a processing procedure for fault determination by the relay device 2 according to the first embodiment. FIG. 7 is a flowchart illustrating an example of a processing procedure for fault determination by a relay device.

The relay device 2 receives a fault determination request from another relay device 2 (S301). The control device 10 of the relay device 2 identifies the IP address of a transmission source, the IP address of a transmission destination, and a sequence number of a packet included in the received fault determination request (S302). The control device 10 refers to the reception history table 30, and determines the presence or absence of a record having a flag 0 and corresponding to the reception of a packet having the same IP address of the transmission source and the same IP address of the transmission destination as the identified packet, and having an immediately preceding sequence number (S303).

When there is no record having a flag 0 and corresponding to the reception of a packet having the immediately preceding sequence number (No in S303), the control device 10 ends the fault determination processing. Before the control device 10 ends the fault determination processing, when there are records corresponding to the reception of packets having the same identified IP address of the transmission source and the same identified IP address of the transmission destination in the reception history table 30, the control device 10 may delete the records corresponding to the reception of the packets having the same identified IP address of the transmission source and the same identified IP address of the transmission destination.

When there is a record having a flag 0 and corresponding to the reception of a packet having the immediately preceding sequence number (Yes in S303), the control device 10 determines that there is a fault related to the fault determination request, and transmits fault information to the administrator terminal 4 (S304). The control device 10 deletes, from the reception history table 30, the record corresponding to the reception of the packet having the same IP address of the transmission source and the same IP address of the transmission destination, the IP addresses being included in the fault determination request, and then ends the fault determination processing.

Incidentally, a flow in which the reception history table 30 is referred to in the fault determination processing is illustrated. However, without limitation to this, the transmission history table may be referred to, or both of the reception history table 30 and the transmission history table may be referred to in one time of fault determination processing.

According to the first embodiment, each relay device 2 performs the history information generation processing in response to packet transfer processing. Therefore, the relay device 2 receiving a SACK packet can perform the fault detection processing, and determine the presence or absence of a fault in the own device based on history information.

Further, a relay device 2 detecting a fault transmits a fault determination request to the other relay devices 2. Hence, relay devices 2 not receiving the SACK packet can also perform the fault determination processing, and determine the presence or absence of a fault based on history information. Thus, even in a case where there is a location where the transfer path of an outgoing packet and the transfer path of the return SACK packet between end devices are different from each other, the relay devices 2 corresponding to the transfer path of the outgoing packet, the SACK packet not passing through the transfer path of the outgoing packet, can perform the fault determination processing.

In addition, when a fault is detected based on the SACK packet, fault information is automatically transmitted from a relay device 2 in which the fault occurs, and the fault information can be viewed and managed on the managing terminal 4. An administrator can identify a location of the occurrence of the fault on the network based on the fault information. Further, the number of man-hours of work of collecting the logs of the relay devices 2 at the time of the occurrence of the fault is reduced. Hence, problems are suppressed which include a problem that the number of analysis targets becomes enormous due to an increase in system scale and a problem of a difficulty in starting analysis in consideration of an effect on other systems due to multi-tenancy.

A second embodiment will next be described. In the second embodiment, the same parts as in the first embodiment are identified by the same reference numerals in principle, and repeated description thereof will be omitted.

Figure 8:
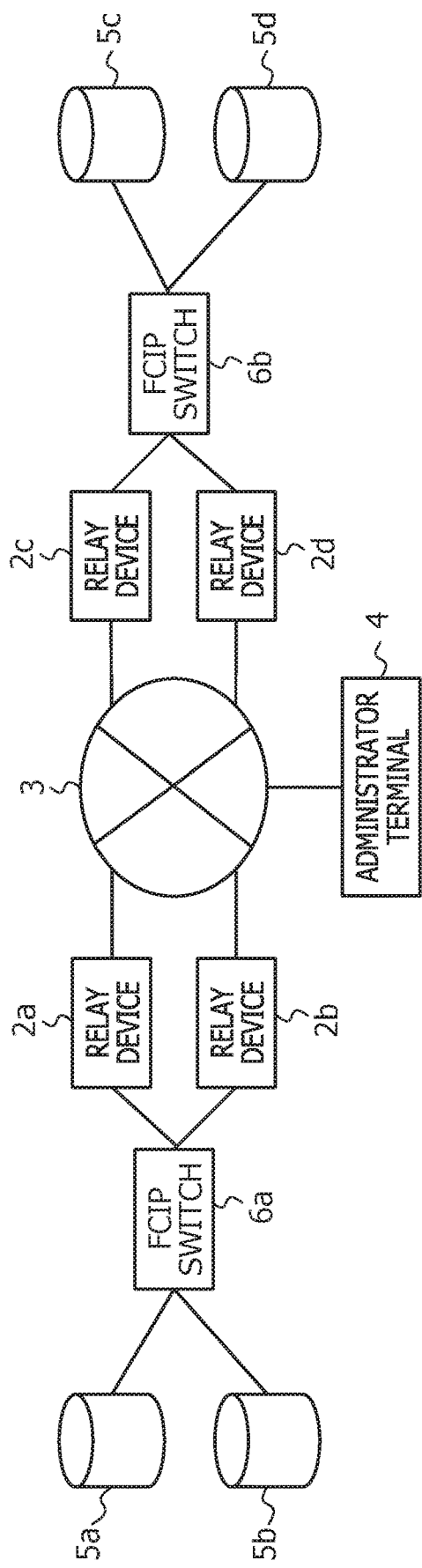
FIG. 8 is a diagram illustrating an example of a configuration of a system.

FIG. 8 is a diagram illustrating an example of a configuration of a system according to the second embodiment. The system according to the second embodiment is a system that uses fibre channel over Internet protocol (FCIP) communication. The system according to the second embodiment includes a storage device 5a, a storage device 5b, a storage device 5c, a storage device 5d, an FCIP switch 6a, an FCIP switch 6b, a relay device 2a, a relay device 2b, a relay device 2c, a relay device 2d, a network 3, and an administrator terminal 4. In the following, when the storage device 5a, the storage device 5b, the storage device 5c, and the storage device 5d are not distinguished from each other, the storage devices will be described as storage devices 5. Similarly, when the FCIP switch 6a and the FCIP switch 6b are not distinguished from each other, the FCIP switches will be described as FCIP switches 6.

The configuration of the system illustrated in FIG. 8 is an example, and the storage devices 5 and the FCIP switches 6 are not limited to the numbers of the storage devices 5 and the FCIP switches 6. In addition, while an example is cited in which the system according to the second embodiment uses FCIP communication, there is no limitation to this, but the system according to the second embodiment may be a system using Internet fibre channel protocol (iFCP) communication, for example.

The storage devices 5 may, for example, be storages independent from individual computers and used by a plurality of computers. Incidentally, though the storage devices 5 and the information processing devices 1 are distinguished from each other for the convenience of description in the second embodiment, the storage devices 5 are a kind of information processing device 1.

Suppose that an example of a hardware configuration of the FCIP switches 6 is similar to that of the relay device 2 illustrated in FIG. 2. For example, an FCIP switch 6 includes a control device 10, a storage device 11, and a network coupling device 12, which are coupled to one another by a system bus 13. The storage device 11 of the FCIP switch 6 stores a program according to the second embodiment. The control device 10 performs history information generation processing, fault detection processing, and fault determination processing according to the second embodiment by reading and executing the program according to the second embodiment, the program being stored in the storage device 11. Incidentally, though the FCIP switches 6 and the relay devices 2 are distinguished from each other for the convenience of description in the second embodiment, the FCIP switches 6 are a kind of relay device 2.

A concrete operation of the FCIP switch 6 will be illustrated in the following. In a case where data is transferred from the storage device 5a to the storage device 5d, for example, in the system illustrated in FIG. 8, fibre channel (FC) communication is performed between the storage device 5a and the FCIP switch 6a and between the storage device 5d and the FCIP switch 6b, and FCIP communication is performed between the FCIP switch 6a and the FCIP switch 6b.

The FCIP switch 6a, for example, generates a packet (referred to as an FCIP packet) formed by encapsulating an FC packet received from the storage device 5a by an IP packet, and transfers the FCIP packet to a WAN side. The header of the FCIP packet includes, for example, the IP address of the FCIP switch 6a as the IP address of a transmission source and the IP address of the FCIP switch 6b as the IP address of a transmission destination.

The FCIP switch 6b, for example, unpacks the FCIP packet received into an FC packet, and transmits the FC packet to the storage device 5d. In addition, the FCIP switch 6a or the FCIP switch 6b transmits a KeepAliveTimeout packet at intervals of one second, for example, to continue FCIP communication between the FCIP switches 6. For example, the FCIP switch 6a or the FCIP switch 6b having a lower IP address may have a role of transmitting the KeepAliveTimeout packet.

As with the relay device 2, the FCIP switch 6 has a function of performing history information generation processing. As with the relay device 2, the FCIP switch 6 adds a record to the reception history table 30 and the transmission history table in response to reception and transmission of an FC packet or an FCIP packet. Further, the FCIP switch 6 retains an FCIP packet corresponding to a record having a flag 0 as a history packet in the storage device 11. The FCIP switch 6 may delete the history packet corresponding to the record when the flag is updated from 0 to 1.

Incidentally, as in the first embodiment, the relay device 2 performs history information generation processing in response to reception and transmission of an FCIP packet. For example, the relay device 2 identifies the IP address of an FCIP switch 6 as a transmission source, the IP address of an FCIP switch 6 as a transmission destination, and a sequence number that are included in the header of the FCIP packet, and adds a record to the reception history table 30 and the transmission history table.

As with the relay device 2, the FCIP switch 6 has a function of performing fault detection processing. The FCIP switch 6 has a function of performing the fault detection processing based on a SACK packet, and also has a function of performing the fault detection processing based on a KeepAliveTimeout packet.

The FCIP switch 6 on the side of receiving KeepAliveTimeout packets determines whether or not a next KeepAliveTimeout packet is received within a given time (for example, one second) of a last KeepAliveTimeout packet.

When the KeepAliveTimeout packet is not received, the FCIP switch 6 detects the non-reception of the KeepAliveTimeout packet as a fault.

Detecting the fault, the FCIP switch 6 identifies the IP address of a transmission source and the IP address of a transmission destination, the IP addresses being included in the header of the last KeepAliveTimeout packet received. The FCIP switch 6 transmits a fault determination request to the relay devices 2 and the other FCIP switches 6 within the system based on the identified IP address of the transmission source and the identified IP address of the transmission destination.

Figure 9:
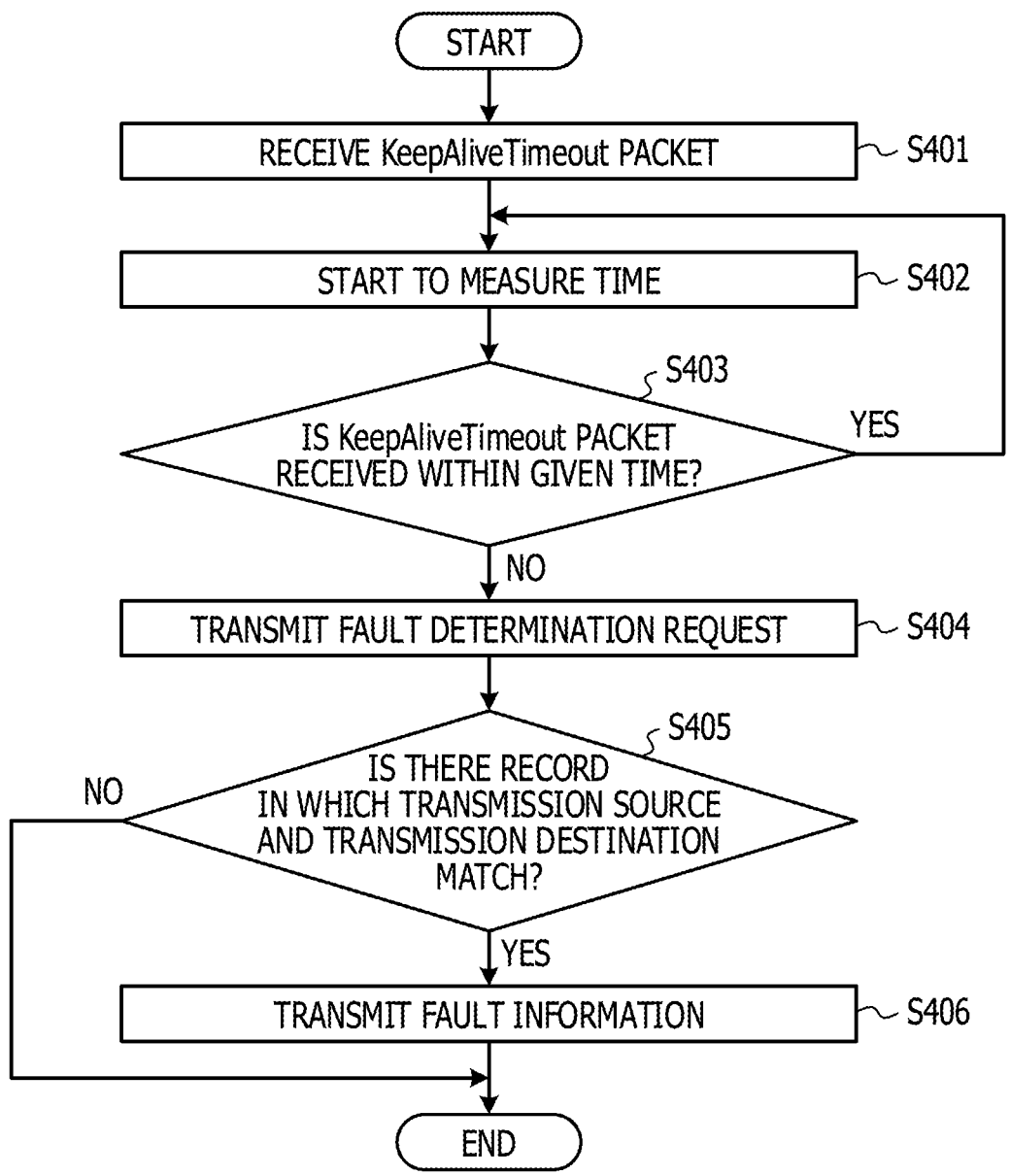
FIG. 9 is a flowchart illustrating an example of a processing procedure for fault detection.

Description will be made of an example of a processing procedure for fault detection by the FCIP switch 6 according to the second embodiment. FIG. 9 is a flowchart illustrating an example of a processing procedure for fault detection by a FCIP switch.

The FCIP switch 6 receives a KeepAliveTimeout packet (S401). The control device 10 of the FCIP switch 6 starts to measure time (S402). The control device 10 determines whether a next KeepAliveTimeout packet is received within a given time of the received KeepAliveTimeout packet (S403).

When the KeepAliveTimeout packet is received within the given time (Yes in S403), the control device 10 returns to S402, and resets the measured time and starts to measure time again.

When the KeepAliveTimeout packet is not received within the given time (No in S403), the control device 10 determines that there is a fault, and transmits a fault determination request including the IP address of a transmission source and the IP address of a transmission destination of the already received KeepAliveTimeout packet to the relay devices 2 and the other FCIP switches within the system (S404).

The control device 10 refers to the reception history table 30, and determines the presence or absence of a record having a flag 0 and corresponding to the reception of a packet having the same IP address of the transmission source and the same IP address of the transmission destination of the already received KeepAliveTimeout packet (S405).

When there is no record having a flag 0 and corresponding to the reception of a packet having the same IP address of the transmission source and the same IP address of the transmission destination (No in S405), the control device 10 ends the fault detection processing.

When there is a record having a flag 0 and corresponding to the reception of a packet having the same IP address of the transmission source and the same IP address of the transmission destination (Yes in S405), the control device 10 transmits fault information to the administrator terminal 4 (S406). The control device 10 deletes the record corresponding to the reception of the packet having the same IP address of the transmission source and the same IP address of the transmission destination of the KeepAliveTimeout packet already received from the reception history table 30, and then ends the fault detection processing. Incidentally, while an example is cited in which the reception history table 30 is referred to, the control device 10 of the FCIP switch 6 may refer to the transmission history table, and perform the fault detection processing.

Figure 10:
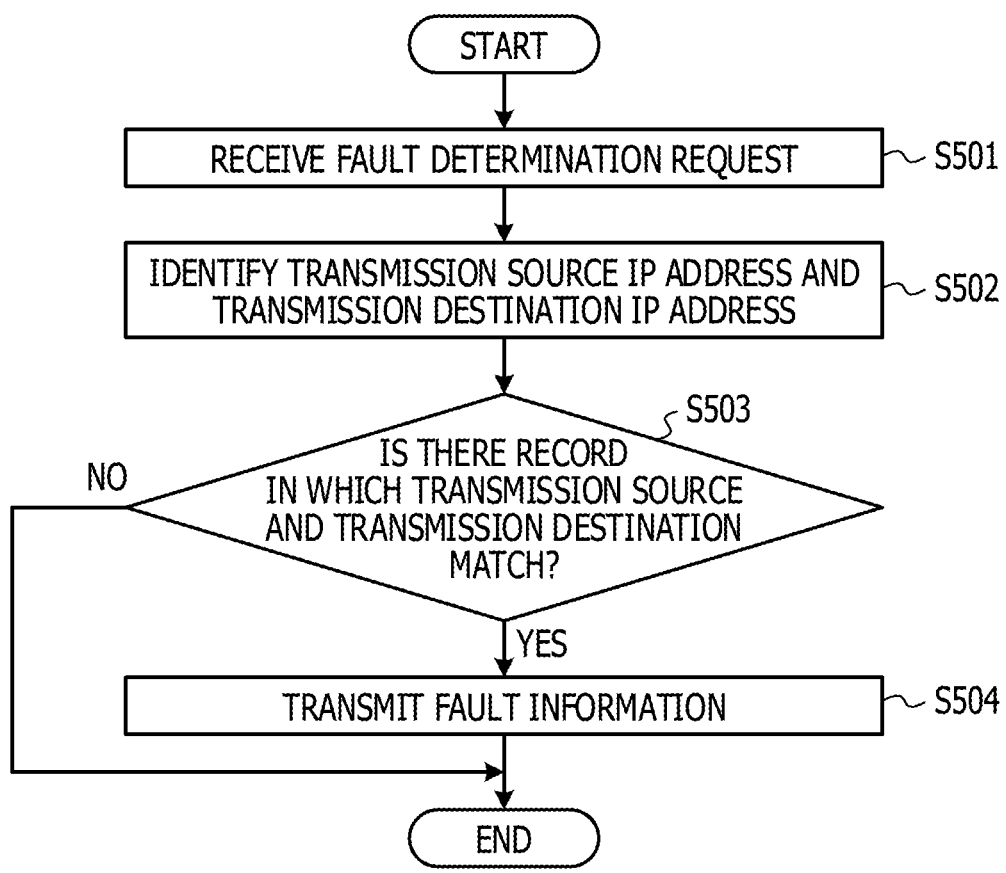
FIG. 10 is a flowchart illustrating an example of a processing procedure for fault determination.

Description will next be made of an example of a processing procedure for fault determination by the relay device 2 according to the second embodiment. FIG. 10 is a flowchart illustrating an example of a processing procedure for fault determination by a relay device.

The relay device 2 receives a fault determination request from an FCIP switch 6 (S501). The control device 10 of the relay device 2 identifies the IP address of a transmission source and the IP address of a transmission destination, the IP addresses being included in the received fault determination request (S502). The control device 10 refers to the reception history table 30, and determines the presence or absence of a record having a flag 0 and corresponding to the reception of a packet having the same identified IP address of the transmission source and the same identified IP address of the transmission destination (S503).

When there is no record having a flag 0 and corresponding to the reception of a packet having the same identified IP address of the transmission source and the same identified IP address of the transmission destination (No in S503), the control device 10 deletes, from the reception history table 30, records corresponding to the reception of packets having the same IP address of the transmission source and the same IP address of the transmission destination, the IP addresses being included in the fault determination request, and ends the fault determination processing.

When there is a record having a flag 0 and corresponding to the reception of a packet having the same identified IP address of the transmission source and the same identified IP address of the transmission destination (Yes in S503), the control device 10 determines that there is a fault related to the fault determination request, and transmits fault information to the administrator terminal 4 (S504). The control device 10 deletes, from the reception history table 30, records corresponding to the reception of packets having the same IP address of the transmission source and the same IP address of the transmission destination, the IP addresses being included in the fault determination request, and ends the fault determination processing. Incidentally, while an example is cited in which the reception history table 30 is referred to, the control device 10 of the relay device 2 may refer to the transmission history table, and perform the fault determination processing.

According to the second embodiment, the FCIP switch 6 can detect a fault based on the KeepAliveTimeout packet in addition to the SACK packet. Hence, triggered by a loss of a KeepAliveTimeout packet, the relay devices 2 and the FCIP switches 6 within the system perform the fault detection processing or the fault determination processing.

The present technology is not limited to the configurations and procedures of the foregoing embodiments, but is susceptible of changes, rearrangements, and the like without departing from the spirit of the present technology.

What is claimed is:

1. A first node device included in a network including a plurality of node devices including a plurality of terminals and a plurality of relay devices relaying a packet transmitted and received between the plurality of terminals, the first node device comprising:
   a memory; and
   a processor coupled to the memory and the processor configured to
   determine whether a second node device detects a possibility of disappearance of a first packet in the network, the first packet being transmitted from a third node device to the second node device, and
   when determining that the second node device detects the possibility, transmit first information to a respective node device on one or more paths present between the first node device and the third node device in the network, the first information requesting to determine whether the respective node device transmits or receives the first packet,
   the determining that the second node device detects the possibility includes:
   when a judgment request related to the first packet is received, identifying a packet address and a first sequence number included in the judgment request, determining whether history information in the first node device includes a source of the identified packet address, a destination of the identified packet address, and a second sequence number immediately before the identified first sequence number, and when a determination is made that the history information in the first node device includes the source, the destination, and the second sequence number, detecting the possibility of the disappearance of the first packet in the network.

2. The first node device according to claim 1, wherein the processor is configured to when receiving second information indicating that the second node device detects the possibility, identify the third node device as a transmission source of the first packet and the second node device as a transmission destination of the first packet in accordance with the second information, and generate the first information including identification information of the second node device and identification information of the third node device.

3. The first node device according to claim 2, wherein the processor is configured to detect a fault on the basis of history information and the second information, the history information associating transmission destination information of packets relayed by the first node device and transmission source information of the packets with each other, the history information being stored in the memory in response to reception or transmission of the packets.

4. The first node device according to claim 3, wherein the history information is associated with a flag determined in accordance with a respective sequence number of the packets.

5. The first node device according to claim 2, wherein the second information is a Selective ACKnowledgment packet.

6. The first node device according to claim 1, wherein
the first node device and the third node device are an identical node device, and
the processor is configured to determine whether the second node device detects the possibility in accordance with a reception state of a KeepAliveTimeout packet.

7. A fault detection method executed by a first node device, the fault detection method comprising:
determining whether a second node device detects a possibility of disappearance of a first packet in a network, the first packet being transmitted from a third node device to the second node device; and when determining that the second node device detects the possibility, transmitting first information to a respective node device on one or more paths present between the first node device and the third node device in the network, the first information requesting to determine whether the respective node device transmits or receives the first packet, the determining that the second node device detects the possibility includes:

when a judgment request related to the first packet is received, identifying a packet address and a first sequence number included in the judgment request, determining whether history information in the first node device includes a source of the identified packet address, a destination of the identified packet address, and a second sequence number immediately before the identified first sequence number, and when a determination is made that the history information in the first node device includes the source, the destination, and the second sequence number, detecting the possibility of the disappearance of the first packet in the network.

8. The fault detection method according to claim 7, comprising:

when receiving second information indicating that the second node device detects the possibility, identifying the third node device as a transmission source of the first packet and the second node device as a transmission destination of the first packet in accordance with the second information; and generating the first information including identification information of the second node device and identification information of the third node device.

9. The fault detection method according to claim 8, comprising:

detecting a fault on the basis of history information and the second information, the history information associating transmission destination information of packets relayed by the first node device and transmission source information of the packets with each other, the history information being stored in the memory in response to reception or transmission of the packets.

10. The fault detection method according to claim 9, wherein the history information is associated with a flag determined in accordance with a respective sequence number of the packets.

11. The fault detection method according to claim 8, wherein the second information is a Selective ACKnowledgment packet.

12. The fault detection method according to claim 7, wherein
the first node device and the third node device are an identical node device, and
the third node device detects the possibility in accordance with a reception state of a KeepAliveTimeout packet.

13. A non-transitory computer-readable medium storing instructions executable by a first node device, the instructions comprising:

one or more instructions for determining whether a second node device detects a possibility of disappearance of a first packet in a network, the first packet being transmitted from a third node device to the second node device; and one or more instructions for, when determining that the second node device detects the possibility, transmitting first information to a respective node device on one or more paths present between the first node device and the third node device in the network, the first information requesting to determine whether the respective node device transmits or receives the first packet, the determining that the second node device detects the possibility includes:

when a judgment request related to the first packet is received, identifying a packet address and a first sequence number included in the judgment request, determining whether history information in the first node device includes a source of the identified packet address, a destination of the identified packet address, and a second sequence number immediately before the identified first sequence number, and when a determination is made that the history information in the first node device includes the source, the destination, and the second sequence number, detecting the possibility of the disappearance of the first packet in the network.

* * * * *